Oct. 11, 1966   R. D. BARNARD ET AL   3,278,275
COUNTERCURRENT WASHING OF SODIUM HYDROXIDE FROM A SALT SLURRY
Filed Feb. 14, 1963

INVENTORS.
Robert D. Barnard
Robert H. Meyer
BY
Griswold & Burdick
ATTORNEYS

United States Patent Office 3,278,275
Patented Oct. 11, 1966

3,278,275
COUNTERCURRENT WASHING OF SODIUM
HYDROXIDE FROM A SALT SLURRY
Robert D. Barnard, Walnut Creek, and Robert H. Meyer,
Concord, Calif., assignors to The Dow Chemical Company, Midland, Mich., a corporation of Delaware
Filed Feb. 14, 1963, Ser. No. 258,394
1 Claim. (Cl. 23—312)

This invention relates to a process and apparatus for washing salt, and more particularly relates to a process whereby caustic is removed from salt by continuous countercurrent washing.

Sodium chloride is a by-product in the manufacture of sodium hydroxide. It is desirable and necessary that the sodium chloride be removed in order to give a pure sodium hydroxide product. When the sodium chloride is removed, some sodium hydroxide is generally carried along with the sodium chloride. Loss of this sodium hydroxide is undesirable and expensive. Thus, it is desirable to wash the separated sodium chloride with water so as to remove the residual sodium hydroxide without redissolving excessive quantities of sodium chloride.

Previously, this washing has been accomplished as by means of a centrifuge. Considerable sodium hydroxide (caustic) has been lost in spite of the relatively high efficiency of centrifuging methods.

It is therefore an object of this invention to provide a process and apparatus wherein relatively large amounts of aqueous, caustic-containing sodium chloride (salt) slurry may be treated to recover substantially all of the caustic from the salt without significant redissolution of the salt.

Figure 1:
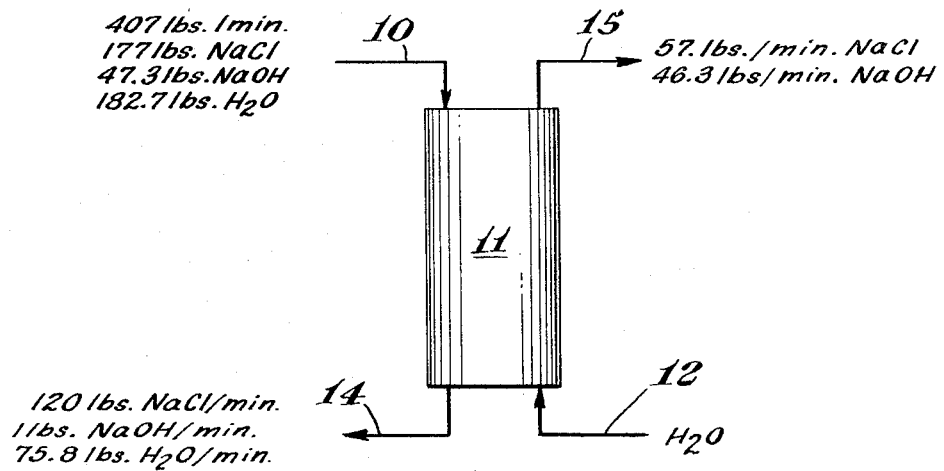
Figure 2:
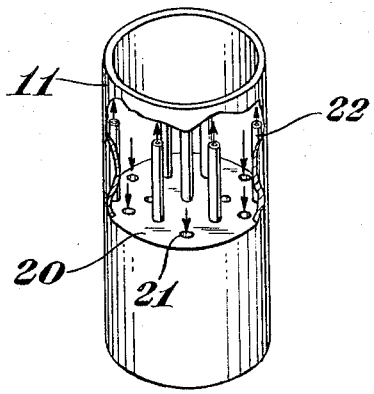

Other objects and advantages of the present invention will become apparent in the course of the following specification when taken in light of the accompanying drawing in which:

FIGURE 1 is an overall schematic flow diagram of the process of this invention illustrating the specific embodiment of Example I herein, and FIGURE 2 is a view of one plate of the column of the present invention.

The objects of the present invention may be accomplished by feeding an aqueous slurry of salt and caustic from a caustic process through a feed line 10 to the top of a column 11, supplying water from a water line 12 to the bottom of the column 11, removing salt substantially free of caustic from the bottom of the column 11 by means of a duct 14, and removing aqueous salt solutions containing substantially all the caustic of the original slurry feed mixture from the top of column 11 by means of a line 15.

Within the column 11 are a plurality of plates of the type illustrated in FIGURE 2. Each plate 20 contains a number of downcomer holes 21 and a number of riser tubes 22.

Downcomer holes 21 should be of sufficient size to allow solid particles to pass through without clogging or bridging. When bridging due to air bubbles and the like is a serious problem, short tubes on the order of about ½ to 1 inch in length may be attached to the under side of the downcomer holes 21, thus assuring that such bubbles will follow the liquid path up the riser tubes 22 rather than blocking the downcomers. The number of downcomer holes on each plate is dependent on the downward flow rate of aqueous salt-caustic slurry feed and on the diameter of the column. Downcomer diameter should be minimized since excess diameter will cause more back mixing with a consequent lowering of efficiency.

Risers 22 are generally provided in about equal numbers with the downcomer holes 21, and are preferably alternately interspersed therewith. When the number of risers 22 is equal to the number of downcomer holes 21, the riser diameter must be such that it may carry upward the amount of liquid being added to wash the amount of solid passing through each downcomer. Further, the diameter should be large enough so that the back pressure across the tray will not prevent downward flow of solids through the downcomer. Riser tubes 22 should be of sufficient height so as to remain above solids which may settle on the tray 20. The minimum required height will vary with the slurry feed rate, generally rising as the feed rate increases.

In the column 11, there must be sufficient space between plates 20 that thorough mixing of liquid from the risers 22 with solids from the downcomer holes 21 in the next higher plate will take place. A large space between plates will usually give best mixing, but economics generally dictates a distance less than the ideal distance.

In operation, the bottom of the column 11 is usually designed to contain a reservoir of salt and saturated brine. Water entering the bottom of the column is passed through this reservoir and becomes saturated with salt. As the salt saturated water (brine) passes upwardly, it contacts the downcoming salt-caustic slurry in countercurrent manner. Since the brine is already saturated in salt, substantially only caustic is removed from the down flowing slurry by the brine. Washed, solid, substantially caustic-free salt is removed from the reservoir through duct 14 at a rate substantially equal to the input rate of salt through feed line 10 at the top of the column. Saturated brine containing substantially all the caustic of the original slurry feed is removed from the top of the column 11 by means of line 15.

Further understanding of the present invention may be obtained in light of the following examples which are set forth to illustrate, and are not to be construed to limit, the present invention.

Example I

A column five feet in diameter and sixteen feet high was provided with nine trays of the type described supra. Each tray had 162 risers of $^{41}/_{64}$ inch diameter and a height of 6⅛ inches, and 157 downcomer holes of one inch diameter. The trays were spaced 12 inches apart.

Construction of the column was such that the bottom of the column was conical to provide a reservoir for salt and saturated brine.

When operated at a feed flow rate of 407 pounds per minute, said feed containing 177 pounds of salt, 47.3 pounds of caustic, the balance water, 120 pounds of salt containing 1 pound of caustic per minute were removed with 75.8 pounds of water per minute from the bottom of the column. This represents a caustic loss of about 16.7 pounds per ton of salt produced.

Example II

When the number of plates in the column of Example I is increased to 15, and the column height is lengthened by 6 feet, efficiency may be increased so that only 0.3 percent of the caustic fed to the top of the column is lost in the washed salt product. This represents a caustic loss of only about 2.4 pounds per ton of salt produced.

Comparative example

For comparison, a centrifuge typical of those used in commercial separation plants and handling substantially the same feed slurry, but at a lower throughput rate, will give a product which contains about 24 pounds of caustic per ton of salt. This caustic content represents a substantial loss, particularly when compared with the process of Example II.

Various modifications may be made in the present invention without departing from the spirit or scope thereof, and it is to be understood that we limit ourselves only as defined in the appended claim.

We claim:

A process for removing caustic from salt comprising, introducing an aqueous slurry of salt and caustic to the top of a vertical column, having positioned therein a plurality of spaced horizontal plates, said plates describing a plurality of apertures and additionally having positioned thereon a plurality of riser tubes, said tubes being of sufficient height to rise above solid salt which may reside on said plate, introducing water to the bottom of said column by means of a water line, removing from the top of the column by duct means water saturated in salt and containing substantially all of the caustic feed into the column with said slurry, and removing solid salt and saturated brine substantially free of caustic from the bottom of the column by duct means.

References Cited by the Examiner

UNITED STATES PATENTS

| | | | |
|---|---|---|---|
| 299,774 | 6/1884 | Garrigues | 23—312 X |
| 413,616 | 10/1889 | Domeier | 23—312 X |
| 1,943,822 | 1/1934 | Harrington | 23—310 |
| 2,009,510 | 7/1935 | Mobley | 23—270.5 |
| 2,011,186 | 8/1935 | Van Dijck | 23—310 |
| 2,072,382 | 3/1937 | Robinson | 23—270.5 |
| 2,191,919 | 2/1940 | Thayer | 23—270.5 |
| 2,632,720 | 3/1953 | Perry | 23—270.5 |

NORMAN YUDKOFF, *Primary Examiner.*
S. J. EMERY, *Assistant Examiner.*